United States Patent [19]

McRoy

[11] Patent Number: 5,134,617
[45] Date of Patent: Jul. 28, 1992

[54] SINGLE WIRE PLUG-IN CIRCUIT BOARD STATUS MONITOR

[75] Inventor: Steven McRoy, Beverly, Mass.

[73] Assignee: AT&T Bell Laboratories, Murray Hill, N.J.

[21] Appl. No.: 502,482

[22] Filed: Mar. 30, 1990

[51] Int. Cl.$^5$ .................... G01R 31/28; G06F 11/00
[52] U.S. Cl. ................ 371/29.1; 324/158 R; 371/22.1
[58] Field of Search ............ 371/22.1, 22.5, 22.6, 371/29.1; 324/73.1, 158 R; 361/397, 412, 413, 415

[56] References Cited

U.S. PATENT DOCUMENTS

| | | | |
|---|---|---|---|
| 4,168,527 | 9/1979 | Winkler | 371/22.1 |
| 4,180,203 | 12/1979 | Masters | 371/22.6 |
| 4,291,404 | 9/1981 | Steiner | 371/22.1 |
| 4,308,615 | 12/1981 | Koegel et al. | 371/29.1 |
| 4,380,070 | 4/1983 | Steiner | 371/25.1 |

OTHER PUBLICATIONS

AT&T DDM-1000 User's Manual, AT&T 363-20-6-100, "Dual DS3 Multiplexer For Both Loop and Trunk", 1988, pp. 1-16.

Primary Examiner—Charles E. Atkinson
Attorney, Agent, or Firm—Thomas Stafford

[57] ABSTRACT

The status of individual plug-in circuit boards is monitored by a central control unit via an associated single service request wire, in conjunction with a serial data link. The central control unit interrogates possible operational states, e.g., removed, power loss or other failure, operating properly or requesting service, of a plug-in circuit board by controlling a resistive load connected to the single service request wire for the associated plug-in circuit board. This is realized by employing a logic circuit which is controlled by a microprocessor to supply different logic states to a resistor connected to the service request wire at the central control unit.

14 Claims, 2 Drawing Sheets

SINGLE WIRE PLUG-IN CIRCUIT BOARD STATUS MONITOR

TECHNICAL FIELD

This invention relates to maintenance systems and, more particularly, to systems for monitoring the status of plug-in circuit boards.

BACKGROUND OF THE INVENTION

Prior maintenance systems have included arrangements for monitoring the status of plug-in circuit boards. The circuit board status includes its operational states, e.g., inserted and operating properly, whether or not requesting service not inserted, or loss of power or other failure. These prior arrangements typically used multiple wires to communicate the circuit board status to a central control unit or the like. If a single wire was used, there was no way of distinguishing between a circuit board failure and a circuit board removal.

Indeed, the number of input/output (I/O) pins/signals on a plug-in circuit board is limited. Therefore, it is desirable to employ a single wire solution to minimize the number of I/O pins/signals that are needed to communicate the status of the circuit board to the central control unit.

SUMMARY OF THE INVENTION

The problems and/or limitations of prior known plug-in circuit board monitor arrangements are overcome, in accordance with this invention, by controllably interrogating the status of a plug-in circuit board over a single service request wire. The interrogation is achieved, in accordance with the invention, by controlling load conditions connected to and detecting signal states on the single service request wire associated with a plug-in circuit board from a central control unit.

More specifically, the logical state, i.e., high or low, of the single service request wire is readable by the central control unit, and a resistor is connected between the single service request wire and the output of a logic circuit which can be controlled by the central control unit. The process of interrogating the service request wire includes controllably changing the logical state of the logic circuit output and, hence, the resistive load on the single service request wire, in accordance with a prescribed process, in order to determine the status of an associated plug-in circuit board.

DETAILED DESCRIPTION

Figure 1:
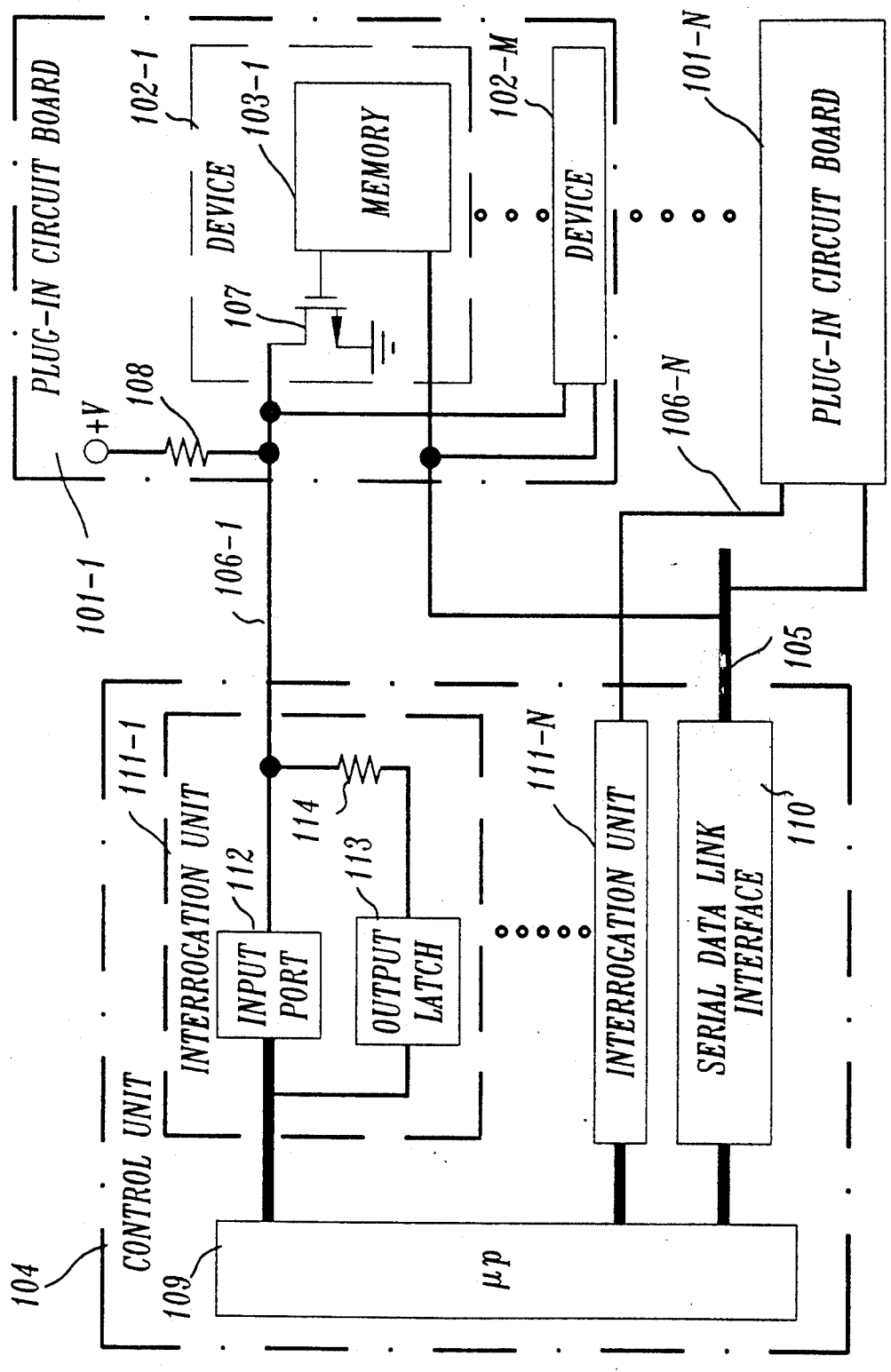
FIG. 1 shows, in simplified block diagram form, details of a maintenance system including an embodiment of the invention.

FIG. 1 depicts, in simplified block diagram form, details of one embodiment of the invention. Accordingly, shown are a plurality of plug-in circuit boards 101-1 through 101-N. Each of plug-in circuit boards 101 typically includes one or more integrated circuit devices 102-1 through 102-M. Each of devices 102 usually includes a memory unit 103 which contains maintenance information on the status of the device or the signals flowing through it. The contents of memory unit 103 in each of devices 102 on each of plug-in circuit boards 101 can be interrogated by central control unit 104 via serial data communications link 105. Any one of a number of known serial data link arrangements may be employed for this purpose. However, depending on the logical states of the maintenance information, memory unit 103 may need to initiate communications with central control unit 104. To this end, and in accordance with the invention, single service request wires 106-1 through 106-N are adapted to be connected between plug-in circuit boards 101-1 through 101-N, respectively, and therein to each of devices 102, and central control unit 104. A so-called open-drain output from semiconductor device 107, e.g., a CMOS field effect transistor, in each of devices 102 is used to interface to an associated one of single service request wires 106. The open-drain output configuration of semiconductor device 107 allows a plurality of similar integrated circuit devices 102 to share a common single service request wire 106-1. Resistor 108 is connected between service request wire 101-1 and a logical high voltage potential to provide a logical 1 when none of devices 102 on plug-in circuit board 101-1 is requesting service.

Central control unit 104 includes microprocessor or microcontroller 109, serial data link interface 110 and interrogation units 111-1 through 111-N. Interrogation units 111-1 through 111-N are adapted to interface with corresponding single service request wires 106-1 through 106-N, respectively. Each of interrogation units 111 includes input port 112, output latch 113 and resistor 114. Serial data link interface 110 is employed to permit data communications in known fashion between microprocessor 109 and memory units 103 in devices 102 on each of plug-in circuit boards 101-1 through 101-N.

Each of interrogation units 111 is employed under control of microprocessor 109, and in accordance with the invention, to controllably interrogate the logical states, i.e., status, of a corresponding single service request wire 106 and, hence, an associated plug-in circuit board 101. Input port 112 allows microprocessor 109 to interrogate the logical state of service request wire 106-1 from plug-in circuit board 101-1. Output latch 113 is connected to resistor 114, which is further connected to service request wire 106-1. These elements are advantageously employed, in accordance with the invention, to permit microprocessor 109 to controllably alter the resistive load, i.e. load condition, being applied to service request wire 106-1 by interrogation unit 111-1. This is realized, in this example, by output latch 113 under control of microprocessor 109 supplying prescribed potentials, e.g., either a logical 0 or a logical 1 state, to resistor 114. It should be noted that the resistance value of resistor 114 must large relative to the resistance value of resistor 108. In one example, the resistance value of resistor 114 is approximately 100K ohms and the resistance value of resistor 108 is approximately 5K ohms. Thus, the ratio of the resistance values of resistors 114 and 108 is approximately 20-to-1. It should be noted that although other logic or circuit arrangements may be employed for supplying appropriate potentials to resistor 114, a separate resistor 114 and a separate input port 112 is required to interrogate a corresponding single service request wire 106. This may be realized by time sharing the elements.

Figure 2:
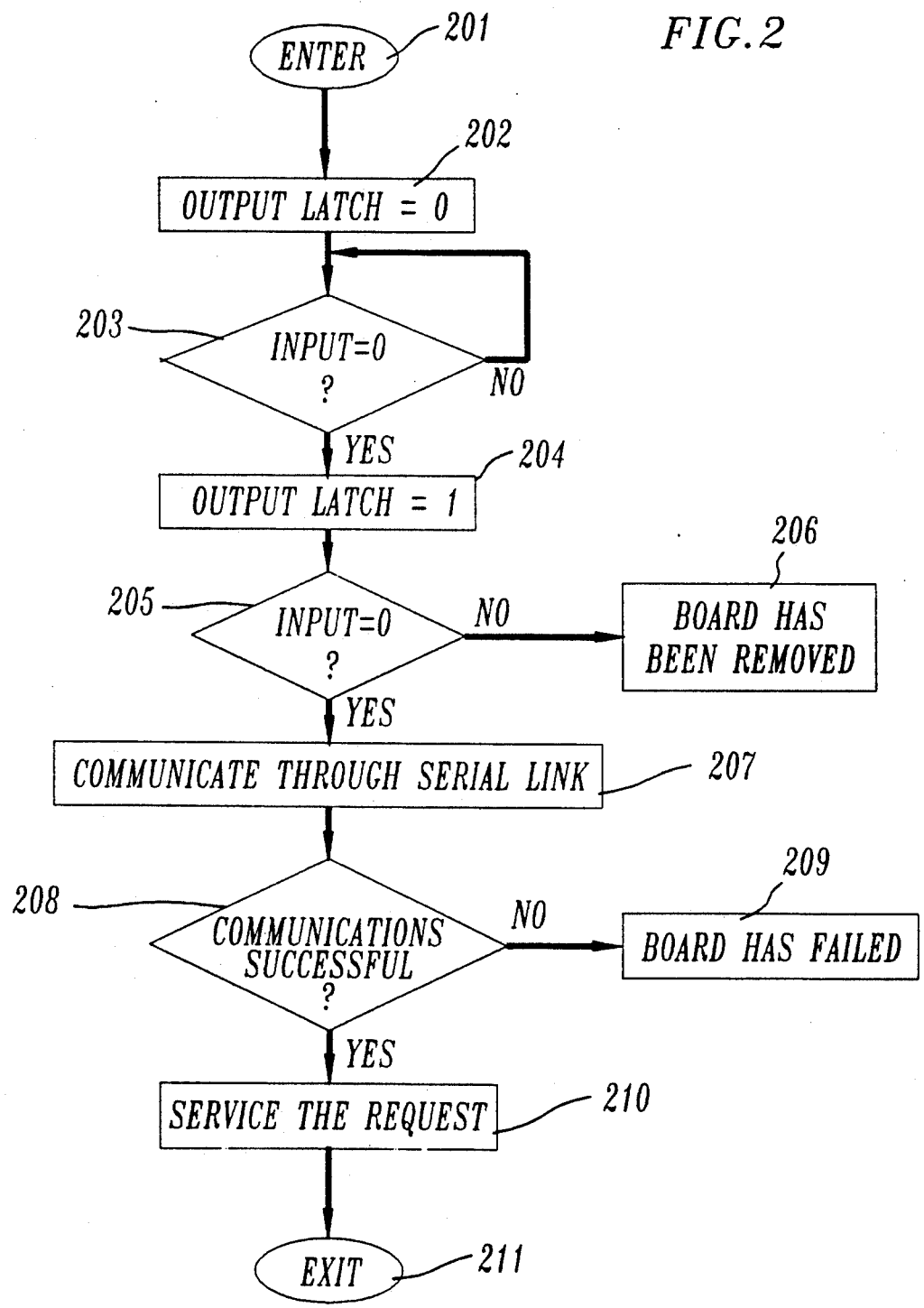
FIG. 2 is a flowchart of the steps in the process of interrogating the service request wire associated with a plug-in circuit board in the embodiment of FIG. 1.

FIG. 2 depicts in flowchart form steps in the operation of this embodiment of the invention under control of microprocessor 109 in interrogating the status of service request wire 106-1 and, hence, plug-in circuit board 101-1. Accordingly, the process of microprocessor 109 is entered through step 201. Then, step 202 initializes output latch 113 to supply as an output a logical 0, i.e., a low state potential. This causes resistor 114 to attempt to pull the logical state of, i.e., the potential on, service request wire 106-1 toward logical 0, i.e., ground potential. Step 203 tests the logical state of service request wire 106-1, as represented in input port 112. If the logical state of service request wire 106-1 is not a logical 0, plug-in circuit board 101-1 is assumed to be inserted in the equipment frame, properly powered, and not requesting service from central control unit 104. This result is realized because the resistance value of resistor 114 is significantly greater than the resistance value of resistor 108. Therefore, if the corresponding device 102 in plug-in circuit board 101-1 is not requesting service, the circuit combination of resistors 114 and 108, in conjunction with the logical 0 output from output latch 113, causes a logical 1 state on service request wire 106-1. If the logical state on service request wire 106-1 is determined to be a logical 0, either the plug-in circuit board 101-1 is requesting service, has been removed, has lost power or has failed in some manner. Then, step 204 causes output latch 113 to change its output state to a logical 1. This, in turn, causes resistor 114 to attempt to pull the logical state of the single service request wire 106-1 toward a logical 1, i.e., a high state potential. Then, step 205 tests the logical state of service request wire 106-1. If the logical state of service request wire 106-1 has now changed to a logical 1, microprocessor 109 can assume that plug-in circuit board 101-1 has been removed and is no longer connected to the service request wire 106-1, as indicated by step 206. If the test result in step 205 indicates that the logical state of service request wire 106-1 is still a logical 0, microprocessor 109 will attempt to read data from memory unit(s) 103 in devices 102 on plug-in circuit board 101-1 via serial data link 105, as shown in step 207. Then, step 208 tests to determine if the data communication via serial data link 105 was successful. If this data communication has failed, microprocessor 109 can assume that plug-in circuit board 101-1 has lost power or failed in some manner, as indicated in step 209. If the data communication via data link 104 succeeds, plug-in circuit board 101-1 is functioning properly and requesting service. Microprocessor 109 would then service the request in the usual manner, as indicated in step 210. The process is then existed via step 211.

The process of interrogating plug-in circuit board 106-1 described above is employed in interrogating each of circuit boards 101-1 through 101-N.

I claim:

1. Apparatus for monitoring the status of one or more pug-in circuit boards comprising:
   at least one interrogation means adapted to be connected to a single service request wire for interrogating signal states on the service request wire, said interrogation means including means for detecting the signal states on the service request wire and means responsive to a control signal for controllably changing a load condition to be applied to the service request wire; and
   means for supplying said control signal and for analyzing the signal states on the service request wire resulting because of changing the load condition.

2. The apparatus as defined in claim 1 wherein said means for controllably changing a load condition includes impedance means having first and second terminals, said first terminal being adapted to be connected to said single service request wire and controllable means for supplying first and second signal states to said second terminal of said impedance means.

3. The apparatus as defined in claim 2 wherein said impedance means comprises a first resistor having a relatively large resistance value.

4. The apparatus as defined in claim 1 further including means for communicating with each of said one or more plug-in circuit boards.

5. The apparatus as defined in claim 4 wherein said means for communicating comprises a serial data link.

6. Apparatus for monitoring the status of a plurality of plug-in circuit boards comprising:
   a plurality of single service request wires adapted to be connected on a one-to-one basis with a corresponding plurality of plug-in circuit boards;
   each of the plurality of plug-in circuit boards including first impedance means having first and second terminals, the first terminal being adapted to be connected to a corresponding one of said plurality of service request wires and a source of a predetermined potential being connected to said second terminal;
   a plurality of interrogation means each being adapted to be connected to a corresponding one of said plurality of service request wires for interrogating signal states on the corresponding service request wire, each of said interrogation means including means for detecting the signal states on the corresponding service request wire and means responsive to a control signal for controllably changing a load condition to be applied to the corresponding service request wire; and
   means for supplying said control signal and for analyzing the signal states on the service request wire resulting because of changing the load condition.

7. The apparatus as defined in claim 6 wherein said means for controllably changing a load condition includes second impedance means having first and second terminals, said first terminal of said second impedance means being adapted to be connected to said single service request wire and controllable means for supplying first and second signal states to said second terminal of said second impedance means.

8. The apparatus as defined in claim 7 wherein said first impedance means comprises a first resistor having a first resistance value and said second impedance means comprises a second resistor having a large resistance value relative to said first resistance value.

9. The apparatus as defined in claim 6 further including means for communicating with each of said plurality of plug-in circuit boards.

10. The apparatus as defined in claim 9 wherein said means for communicating comprises a serial data link.

11. A method of monitoring the status of at least one plug-in circuit board over a single service request wire comprising the steps of:
   (a) supplying a first load condition to the service request wire;
   (b) monitoring to detect a first signal state on the service request wire;
   (c) upon detecting said first signal state in step (b), supplying a second load condition to said service request wire;

(d) detecting the signal state on said service request wire, said signal state detected in step (d) being indicative of whether the plug-in circuit board has been removed.

12. The method as defined in claim 11 when the signal state detected in step (d) is a second state indicating that the plug-in circuit board has not been removed,
  (e) communicating with the plug-in circuit board;
  (f) detecting whether the communication in step (e) was successful, if so the plug-in circuit board has requested service, if not the plug-in circuit board has failed.

13. The method as defined in claim 12 wherein detecting a second signal state on said service request wire while supplying said first load condition in step (a) indicates that the plug-in circuit board is plugged in, operating properly and not requesting service.

14. The method as defined in claim 13 wherein said first signal state is representative of a logical 0 and said second signal state is representative of a logical 1.

* * * * *